US009787807B1

(12) United States Patent
Glickman et al.

(10) Patent No.: US 9,787,807 B1
(45) Date of Patent: *Oct. 10, 2017

(54) PHONE CASE WITH RING DEPLOYMENT MECHANISM AND METHOD OF CAPTURING VIDEO USING SAME

(71) Applicant: Across The Pond Development LLC, New York, NY (US)

(72) Inventors: Keith Glickman, New York, NY (US); James Ambler, New York, NY (US)

(73) Assignee: Across The Pond Development LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/478,708

(22) Filed: Apr. 4, 2017

Related U.S. Application Data

(63) Continuation-in-part of application No. 15/264,933, filed on Sep. 14, 2016, now Pat. No. 9,621,218.

(51) Int. Cl.
| | | |
|---|---|---|
| *H04M 1/00* | (2006.01) | |
| *H04M 1/02* | (2006.01) | |
| *H04B 1/3888* | (2015.01) | |
| *A45C 11/16* | (2006.01) | |
| *A45F 5/00* | (2006.01) | |
| *A45C 13/00* | (2006.01) | |
| *A45C 11/00* | (2006.01) | |

(52) U.S. Cl.
CPC ............ *H04M 1/026* (2013.01); *A45C 11/16* (2013.01); *A45C 13/002* (2013.01); *A45F 5/00* (2013.01); *H04B 1/3888* (2013.01); *H04M 1/0216* (2013.01); *A45C 2011/002* (2013.01)

(58) Field of Classification Search
USPC ................ 455/26.1, 550.1, 575.1–575.8
See application file for complete search history.

(56) References Cited

U.S. PATENT DOCUMENTS

| | | |
|---|---|---|
| 7,146,184 B1 | 12/2006 | Tsitsiashvili |
| 8,276,599 B2 | 10/2012 | Gindi |
| 8,989,826 B1 | 3/2015 | Connolly |
| 2009/0200183 A1* | 8/2009 | Dussin .................. A45C 11/16 206/6.1 |
| 2014/0066142 A1 | 3/2014 | Gipson |
| 2014/0228082 A1 | 8/2014 | Morrow et al. |
| 2014/0354807 A1* | 12/2014 | Brandonisio .......... A45C 11/16 348/143 |
| 2016/0296002 A1* | 10/2016 | Srey ......................... A45F 5/10 |

FOREIGN PATENT DOCUMENTS

WO    WO 2011/049591    4/2011

* cited by examiner

*Primary Examiner* — Fayyaz Alam
(74) *Attorney, Agent, or Firm* — Leason Ellis LLP

(57) ABSTRACT

A phone case configured for use in capturing a digital video during the course of a proposal. The phone case comprises a first housing for receiving a mobile phone, a second housing connected to the first housing by a first hinge, a pedestal disposed within the second housing and connected to a second hinge, the pedestal adapted to support an engagement ring. The second housing is capable of moving to an open position, away from the first housing, and the pedestal moves to an open position while or after the second housing moves to an open position. Methods for using the case to capture digital video during the course of a proposal are also disclosed.

20 Claims, 17 Drawing Sheets

Figure 1A

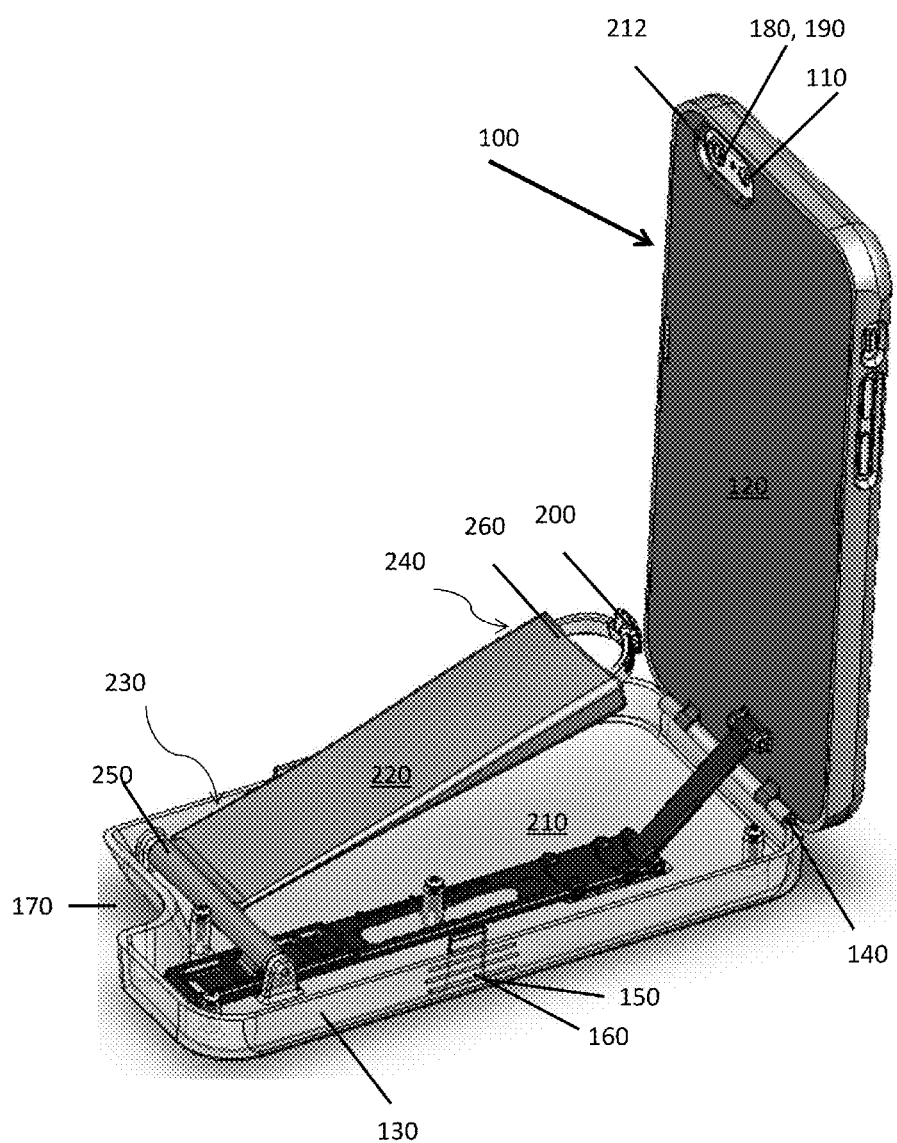

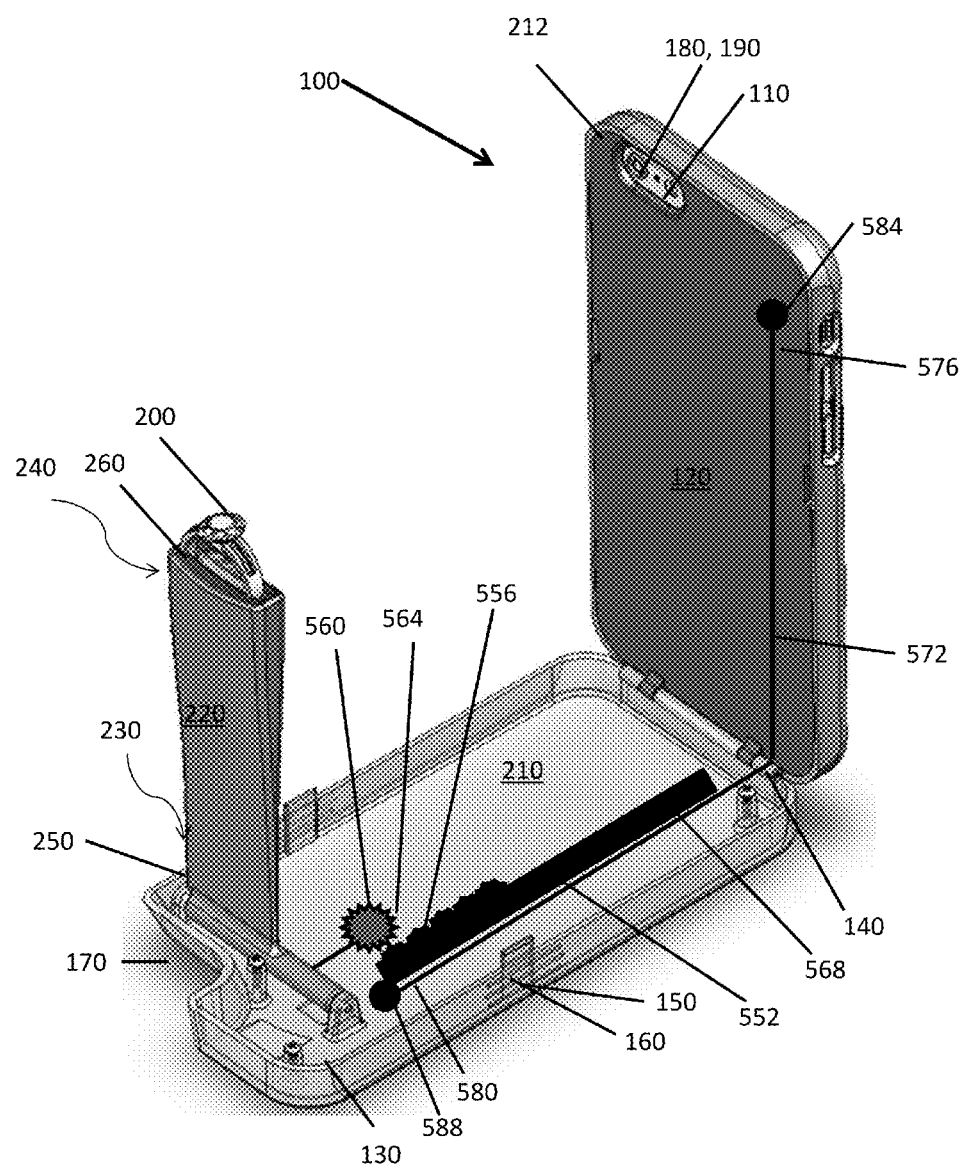

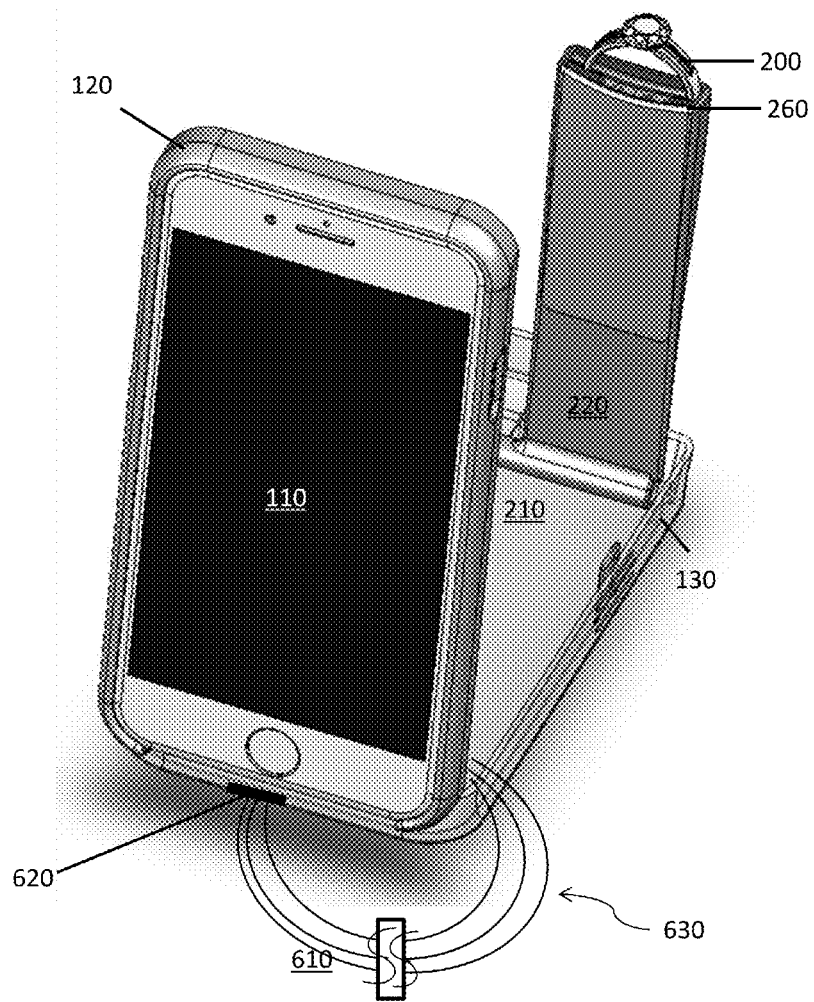

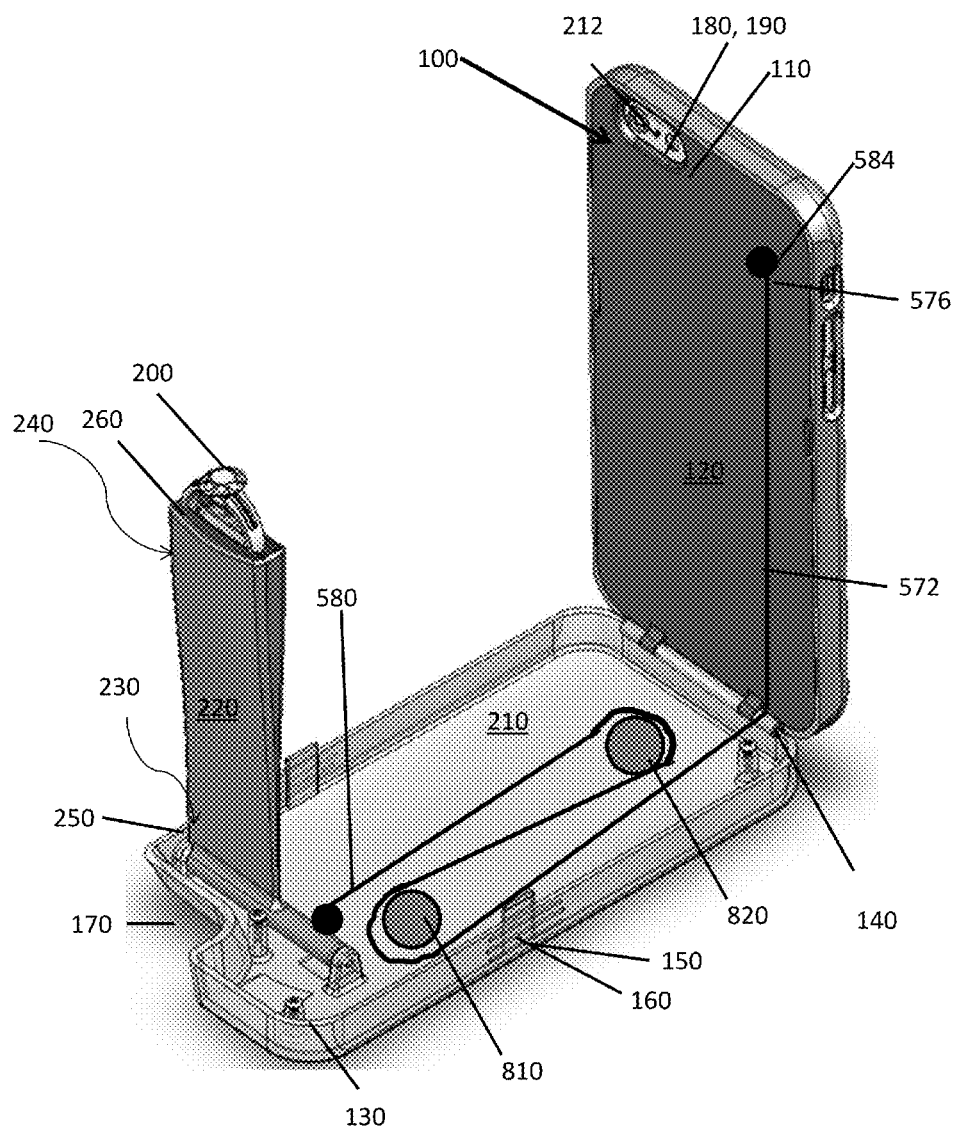

PHONE CASE WITH RING DEPLOYMENT MECHANISM AND METHOD OF CAPTURING VIDEO USING SAME

This application is a continuation-in-part of U.S. application Ser. No. 15/264,933, filed Sep. 14, 2016, entitled "Phone Case with Ring Deployment Mechanism and Method of Capturing Video Using Same," which is hereby incorporated by reference as if set forth in its entirety herein.

FIELD OF INVENTION

The present invention relates to phone case constructions, and, more particularly, to phone case constructions adapted for use in capturing a digital video or photographs during the course of a proposal.

BACKGROUND OF THE INVENTION

A marriage proposal is a special and once-in-a-lifetime event. Many people would like to capture that moment, such as in a picture or on video. However, hiring a private photographer or videographer to capture the moment can be very costly and is out of the budget for many couples. Additionally, hiring a photographer or videographer may not be practical for couples when the proposal is spontaneous or if the proposal occurs at a location where the photographer or videographer would not be able to be discrete.

Since most people carry mobile phones, and all modern mobile phones have video recording capabilities, it is logical that one might want to use their own mobile phone to capture the moment of the proposal. Additionally, having the moment recorded directly onto a smartphone makes it easy for individuals to quickly and efficiently post the photos or videos of the proposal onto social media or to share it with their friends and family. However, holding an engagement ring in one hand and a cell phone attempting to record a video or take a photo in the other hand is neither practical nor romantic. It is with regard to this and other problems that the present invention is directed.

SUMMARY OF THE INVENTION

The present invention concerns, in one aspect, a phone case configured to assist in capturing a digital video and photos during the course of an engagement proposal. In other aspects, the invention concerns a method for capturing the moment of an engagement proposal using a mobile electronic device such as a smartphone.

In accordance with a broad aspect of the invention, a phone case comprises two housings, a first housing for receiving a mobile phone and a second housing connected to the first housing by a first hinge. The phone case further comprises a pedestal disposed within the second housing and connected to a second hinge. The pedestal is adapted to support an engagement ring. The second housing is capable of moving from a closed position, where it is in contact with the first housing, to an open position, moving away from the first housing. The pedestal can move to a raised position while or after the second housing moves to an open position. A free end of the pedestal contains a ring retainer into which the engagement ring can be securely held in place.

In accordance with a more particular aspect of the invention, the phone case can comprise additional features. The second housing can further comprise an aperture in register with the lens of the phone camera such that when the second housing moves to an open position the second housing does not obstruct the field of view of the camera. The phone case can additionally have a securing mechanism to keep the first housing securely connected to the second housing until a latch is used to release the second housing and permit it to move to an open position. The second housing can further comprise a flexible portion to enable displacement of a portion of the second housing in the event that an oversized ring is placed within the second housing.

In accordance with further, optional aspects of the invention, the ring is supported within the field of view of the lens of the camera.

These and other aspects and features will be appreciated from the accompanying drawing figures and description of certain embodiments of the invention.

BRIEF DESCRIPTION OF THE DRAWING FIGURES

FIG. 2C is a rear perspective view of the embodiment of the invention of FIG. 2A with the second housing in an open position and the pedestal in a partially raised position.

FIG. 5B is one embodiment of the pedestal movement mechanism being a rack and pinion mechanism.

FIGS. 6A-6C show one embodiment of the pedestal movement mechanism being a motor.

FIG. 8 is one embodiment of the pedestal movement mechanism being a pulley system.

DETAILED DESCRIPTION OF CERTAIN EMBODIMENTS OF THE INVENTION

By way of overview and introduction, this application is directed to a phone case construction that enables a digital video or photographs during the course of an engagement proposal, and to methods concerning same.

Figures 1, 1A:
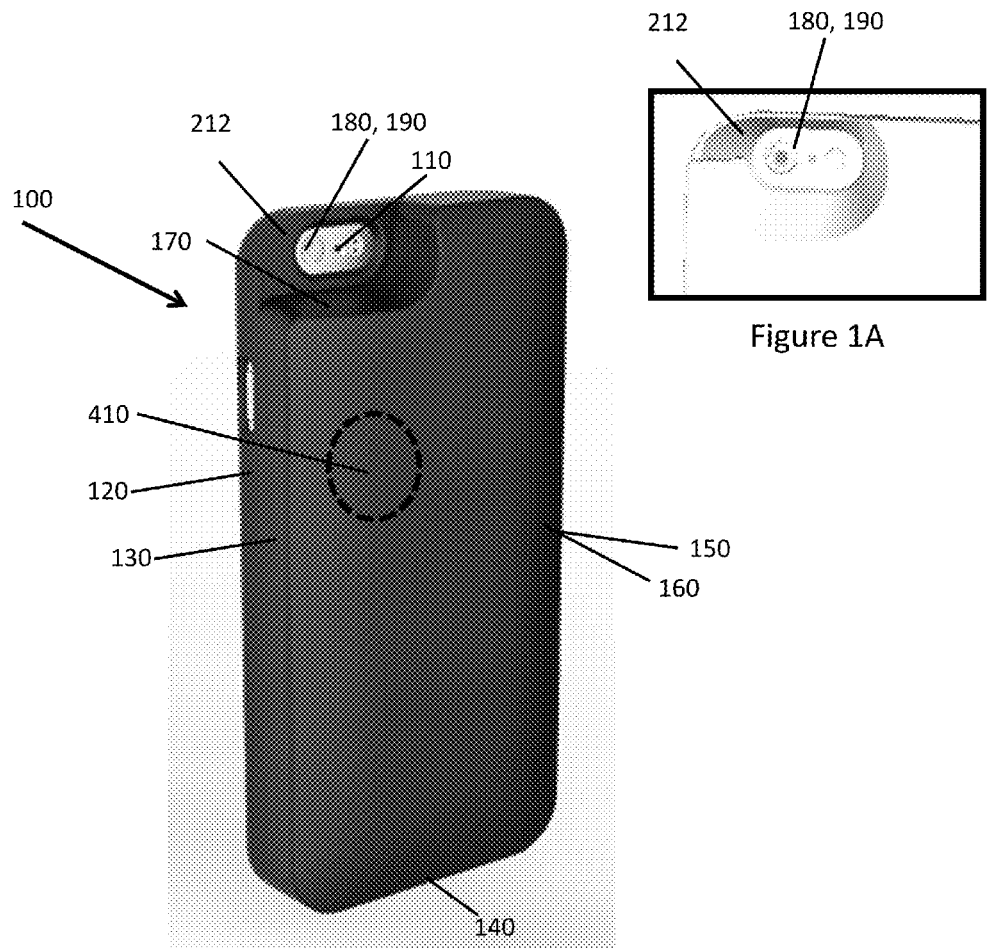
FIG. 1 is a rear-facing view of an embodiment of the invention in a closed position.
FIG. 1A is a detail view of FIG. 1 showing an embodiment that provides a continuous rear surface.

FIG. 1 is an embodiment of the phone case 100 in a closed position. The phone case 100 comprises two housings 120, 130. The first housing 120 is sized and shape for use in receiving the phone 110. The second housing 130 attaches to the first housing 120 such that, when in a closed position, the first housing 120 and the second housing 130 are adjacent to one another. The second housing 130 is sized and shaped to fit an engagement ring 200 within a hollow cavity 210 formed between the first housing 120 and the second housing 130. The case is designed to look sleek and slim, to resemble a case having a built-in extra battery pack, in order to maintain discretion and not reveal or suggest that an engagement ring is housed within the case.

A first hinge 140 is disposed between and connects the first housing 120 and the second housing 130. In one embodiment, the first hinge 140 is located at the bottom of the phone case. The first hinge 140 enables the second housing 130 to move with respect to the first housing 120. The second housing 130 is movable about the first hinge 140 away from the first housing 120 to an open position, as shown in FIGS. 2A-2C and FIGS. 3A-3D. The second housing is moveable about the first hinge toward the first housing to a closed position, as illustrated in FIG. 1.

Optionally, a securing mechanism 150 is located on the phone case 100 to secure the second housing 130 to the first housing 120 in a closed position. In one embodiment, the securing mechanism 150 comprises a releasable latch 160. In another embodiment, the securing mechanism 150 comprises more than one releasable latch 160, such as two releasable latches 160. When more than one latch is provided, they can operate independently of each other in order to prevent the second housing 130 from opening accidentally. The releasable latch 160 is moveable to permit the second housing 130 to move from the closed (latched) position to the open (unlatched) position. The releasable latch 160 can be moveable, for example, by pressing the latch inward. In one embodiment, the latch comprises a tooth at the end of a living hinge, the tooth being engaged to a portion of the first housing when latched and moved to a position free of engagement with the housing when pressed by the user.

The second housing 130 of the phone case 100 further comprises a cut-out 170 sized and shaped such that the camera 180 of the mobile phone 110 is in register with the cut-out 170 when the first housing 120 is attached to the mobile phone 110. The camera 180 of the mobile phone 110 further comprises a lens 190. In one embodiment, the second housing 130 is shaped such that, when moving from an open position to a closed position, the second housing 130 remains clear of the field of view 310 of the lens 190 of the camera 180 throughout the movement from the closed position to the open position. Because of the placement of the cut-out 170, the camera 180 maintains an uninterrupted field of view notwithstanding any opening of the second housing, such as during the capture of an engagement proposal. This is important to prevent the camera 180 from experiencing a focus jump between the second housing 130 and the engagement ring 200, which could happen if the second housing came into the field of view 310 while opening the second housing during capture of the engagement proposal.

Figure 2A:
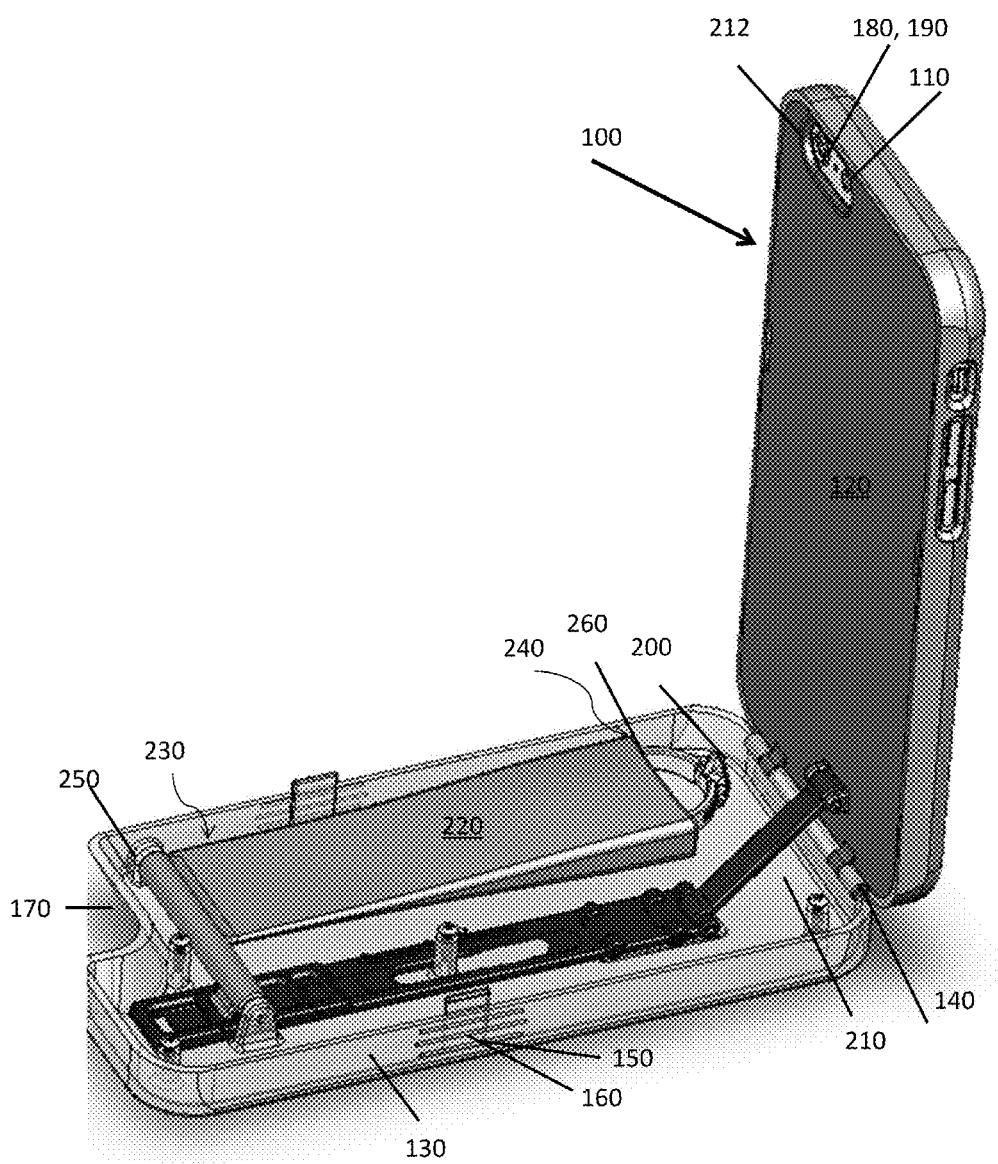
FIG. 2A is a rear perspective view of one embodiment of the invention with the second housing in an open position and the pedestal in a lowered position.

Optionally, a shroud 212 can be provided on the first housing 120 which at least completes an outer periphery of the case 100 when the second housing is in its closed position, and which optionally encircles the lens (as shown in FIGS. 1A and 2A). The shroud 212 is stationary on the first housing 120 and does not move when the second housing 130 moves, for example, from the closed position to the open position. Additionally, the shroud 212 does not obstruct the field of view 310 of the lens 190 of the camera 180 of the phone 110.

Figure 2B:
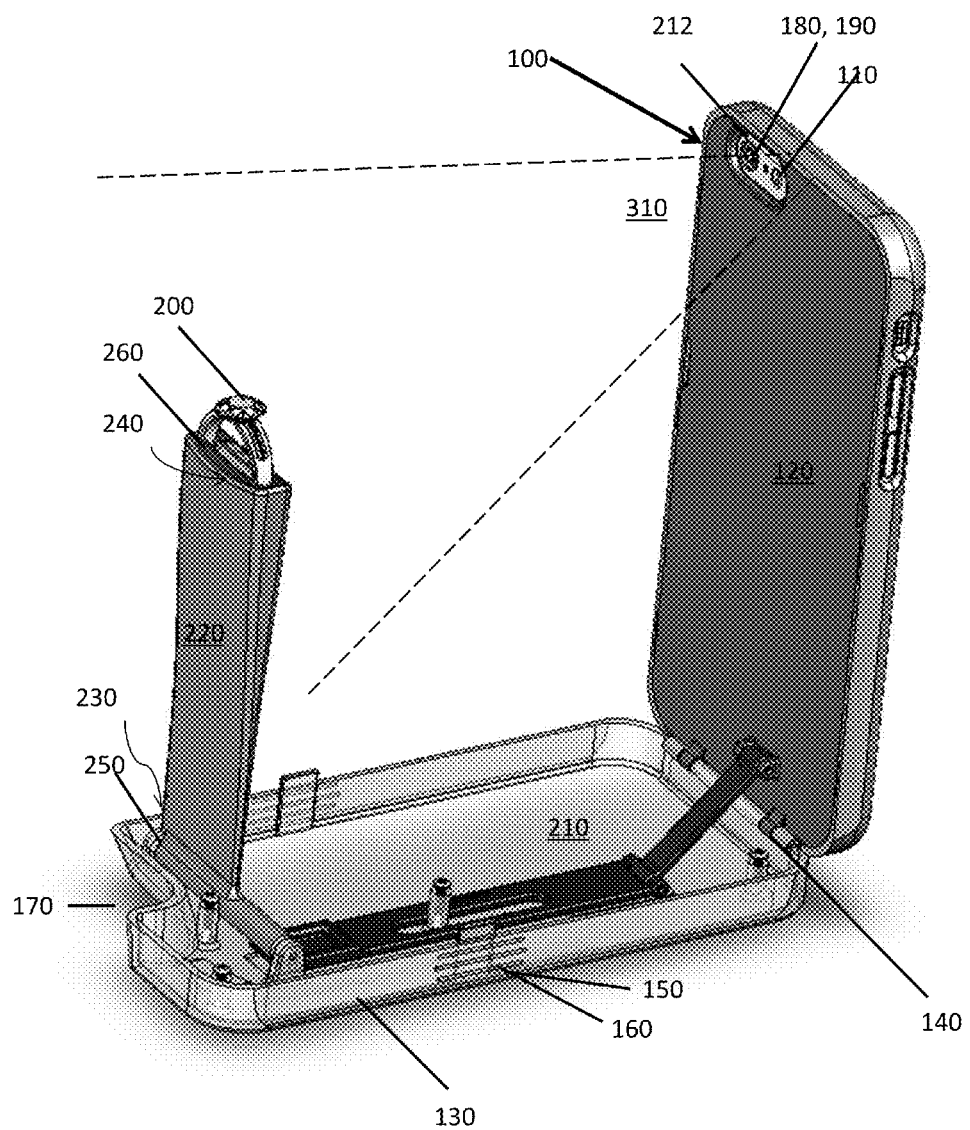
FIG. 2B is a rear perspective view of the embodiment of the invention of FIG. 2A with the second housing in an open position and the pedestal in a raised position.
Figure 2D:
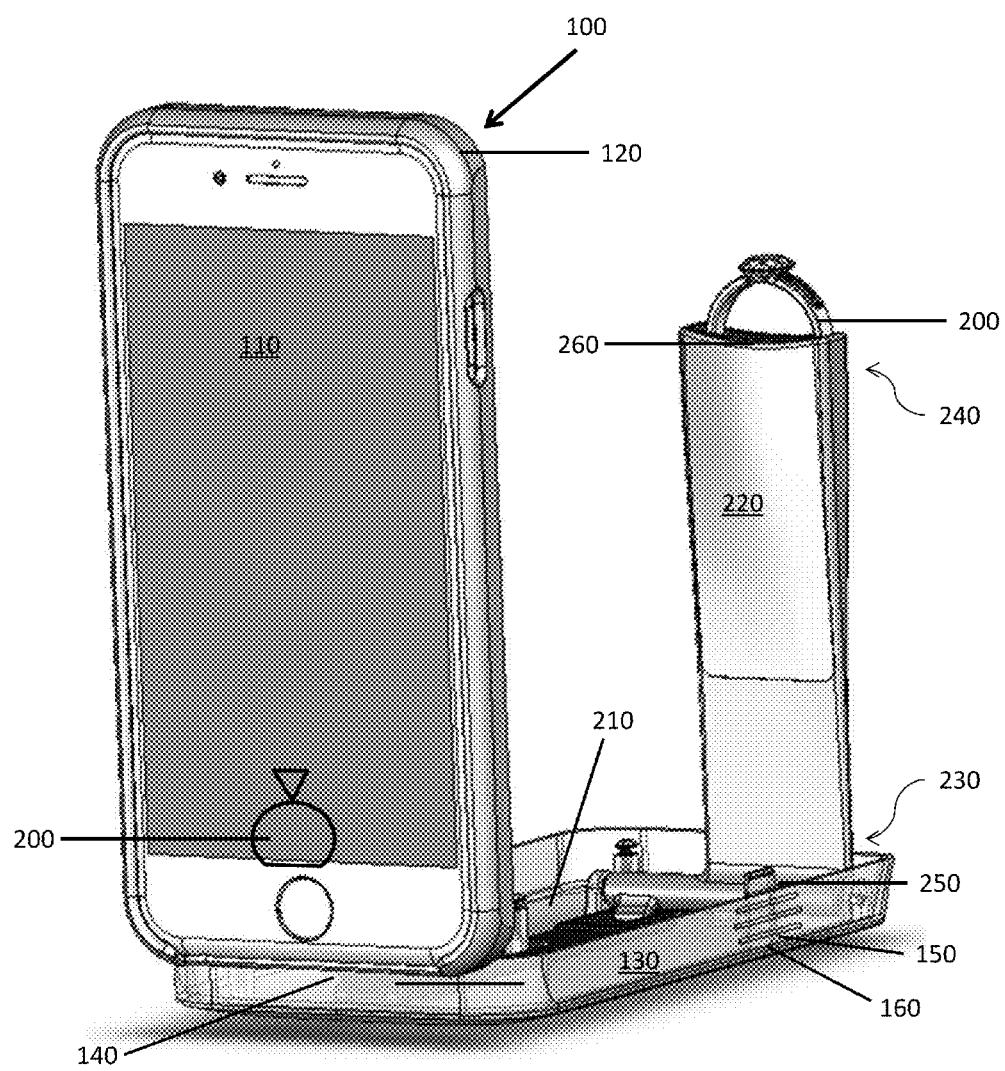
FIG. 2D is a front perspective view of the embodiment of the invention of FIG. 2A with the second housing in an open position and the pedestal in a raised position.

FIGS. 2A-2C show one embodiment of the present invention in an open position. As shown in FIG. 2A, the first housing 120 is attached to the mobile phone 110 and the second housing 130 has been moved to an open position relative to the first housing 120. The second housing 130 moves to its open position about the first hinge 140. The hollow cavity 210 that is formed between the first housing 120 and the second housing 130 is visible when in the second housing is in the open position.

A pedestal 220 is disposed within the hollow cavity 210. The pedestal 220 is adapted to support an engagement ring 200. The pedestal comprises a first end 230 and a free end 240. The engagement ring 200 is mounted to the free end 240 of the pedestal 220. A second hinge 250 connects the first end 230 of the pedestal 220 to the second housing 130. The pedestal 220 is movable to a raised position about the second hinge 250 relative to the second housing 130, and is movable to a lowered position about the second hinge 250 relative to the second housing 130. When the second housing is not in a closed position, the pedestal 220 can move to a raised position. In a raised position, the free end 240 is raised relative to the second housing 130.

FIG. 2A is an embodiment of the invention with the second housing 130 in an open position and the pedestal 220 in a lowered position. FIG. 2B is an embodiment of the invention with the second housing 130 in an open position and the pedestal 220 also in a raised position. In certain embodiments described below, the pedestal 220 moves to a raised position in response to the second housing 130 having moved toward or being in the open position.

Figure 4A:
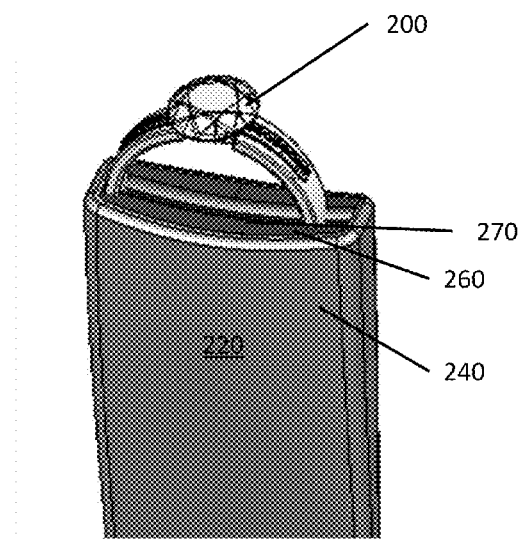
FIG. 4A is a close up view of the free end of the pedestal in accordance with one embodiment.
Figure 4B:
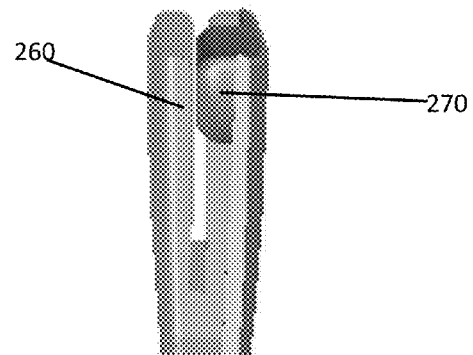
FIG. 4B is a breakaway view of the free end of the pedestal in accordance with one embodiment.

FIGS. 4A and 4B provide a detail view of the free end 240 of the pedestal 220 and the ring retainer 260. In some embodiments, as illustrated, the pedestal 220 includes a ring retainer 260 supported on its free end 240. The ring retainer 260 holds and supports the engagement ring 200. In one embodiment, the ring retainer comprises a protrusion 270. In another embodiment, the ring retainer comprises a plurality of protrusions 270. The protrusions 270 support the engagement ring 200, keep it in place within the ring retainer 260 during and after the second housing 130 is moved to an open position and the pedestal 220 is moved to a raised position, or both. In one embodiment, at least one protrusion 270 comprises a flexible material. In another embodiment, at least one protrusion 270 comprises a non-flexible material. As illustrated, the protrusion or protrusions are supported proximate to the free end 240 of the pedestal 220.

In some embodiments, internal portions of the ring retainer can be made of a rubber material. The ring retainer can include an internal centered dimple for added security so that when the ring in placed inside movement is limited. In addition, the ring retainer can be formed so as to limit the depth to which the ring can be pushed into the retainer. The ring retainer can also include a flange that prevents the ring retainer surface from hitting the bottom of the case when it is retracted.

In the embodiment shown in FIGS. 2A-2C, the pedestal 220 is sized, shaped, and positioned such that when the pedestal 220 is in a raised position, the engagement ring 200 supported by the free end 240 of the pedestal 220 is in the field of view 310 of the lens 190 of the camera 180 of the phone 110. In one embodiment, as shown in FIGS. 2A-2C, such as for use in an iPhone or other phone where the camera 180 is located off-center, the pedestal 220 can also be located off-center, such as to the right side of the case or the left side of the case, in order to be in the field of view 310. In another embodiment, such as for use in a phone where the camera 180 is centered, the pedestal 220 can also be centered in order to be in the field of view 310. In one embodiment, for the ring 200 to be in the field of view 310 of the camera 180, the pedestal 220 is at a right angle (90°) with respect to the second housing 130 and is parallel to the phone 110 and the first housing 120. FIG. 2C is a front perspective view of the case 100 attached to a phone 110. Visible on the screen 280 is an image showing the individual being proposed to with the engagement ring 200 in the foreground. In this embodiment, the flash of the camera is preferably turned off in order to minimize glare of the flash reflecting off of the engagement ring 200.

Figure 3A:
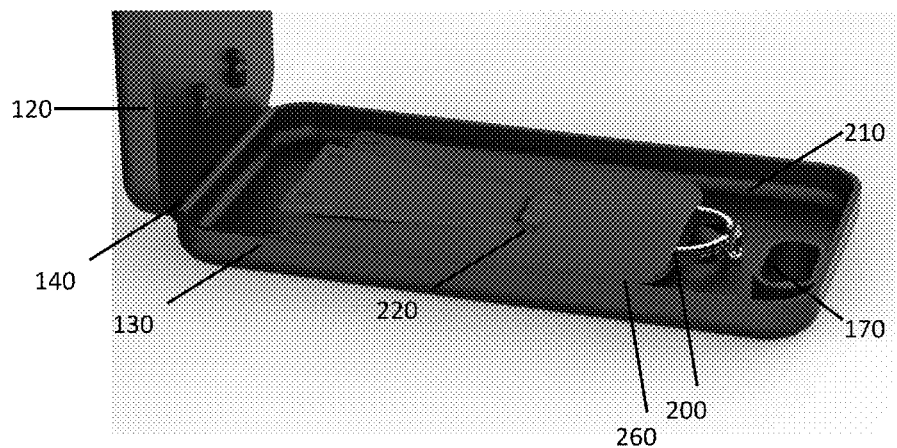
FIG. 3A is a partial side view of one embodiment of the invention with the second housing in an open position and the pedestal in a lowered position.
Figure 3B:
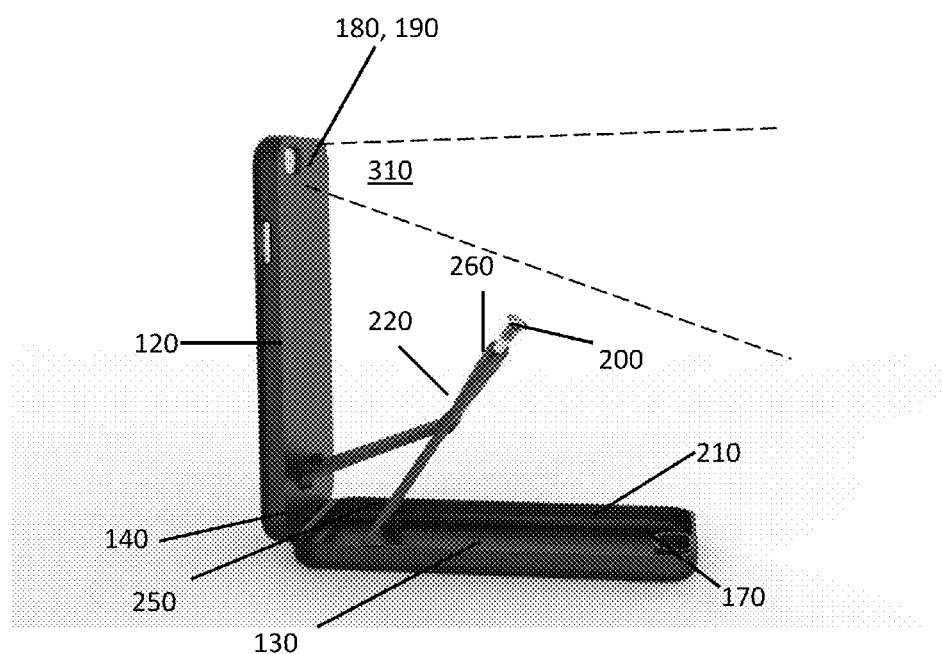
FIG. 3B is a side view of the embodiment of the invention in FIG. 3A with the second housing in an open position and the pedestal in a raised position.
Figure 3C:
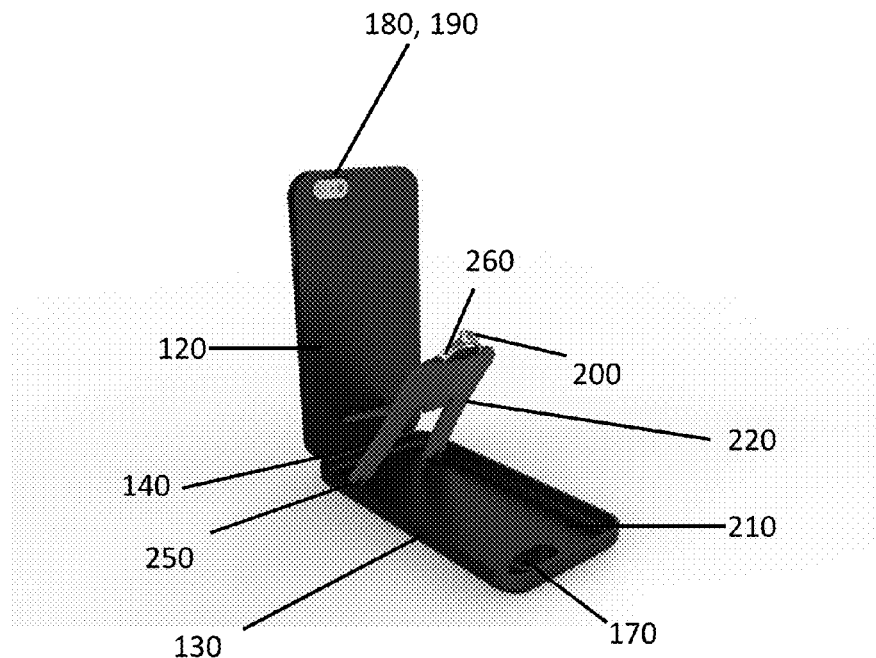
FIG. 3C is a rear perspective view of the embodiment of the invention in FIG. 3A with the second housing in an open position and the pedestal in a raised position.
Figure 3D:
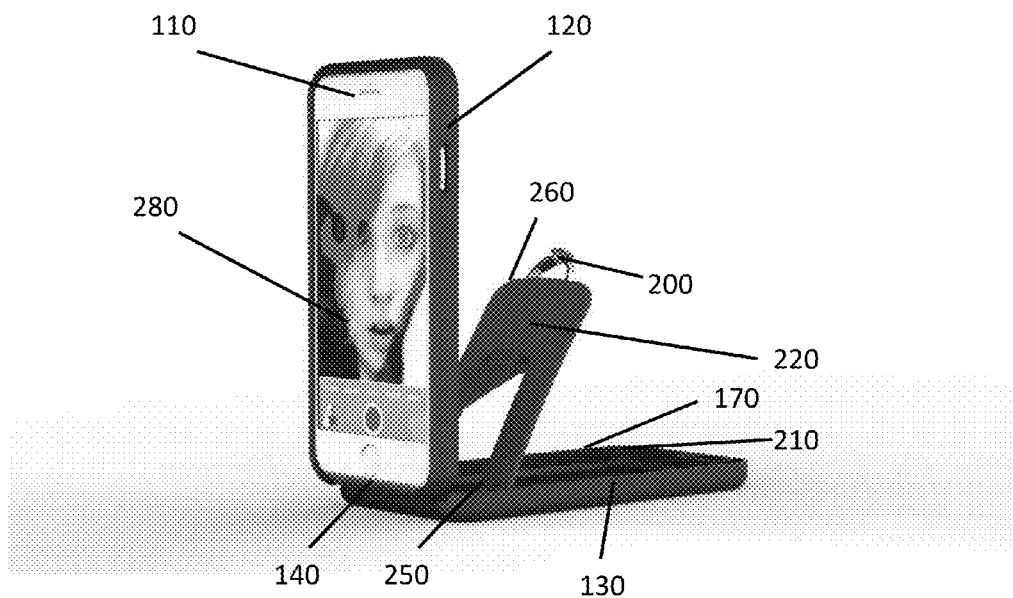
FIG. 3D is a front perspective view of the embodiment of the invention in FIG. 3A with the second housing in an open position and the pedestal in a raised position.

FIGS. 3A-3D show a second embodiment of the present invention in an open position. In the embodiment shown in FIGS. 3A-3D, the pedestal is sized, shaped, and positioned such that when the pedestal 220 is in a raised position, the engagement ring 200 on the free end 240 of the pedestal 220 is outside of the field of view 310, that it, it is clear of the lens 190 of the camera 180 of the phone 110. In one embodiment, the pedestal 220 is centered within the phone case 100. FIG. 3A shows the second embodiment with the second housing 130 in an open position and the pedestal 220 in a lowered position. FIGS. 3B and 3C show the second embodiment with the second housing 130 in an open position and the pedestal 220 in a raised position. FIG. 3D is a front perspective view of the second embodiment. Visible on the screen 280 is an image showing only the individual being proposed to. In contrast to the embodiment of FIG. 2C, the ring 200 is not within view of the camera 180. Optionally, as with the first embodiment of FIGS. 2A-2C, the pedestal 220 can move to a raised position in response to the second housing 130 having moved toward or being in the open position.

Various mechanisms can be provided for moving the pedestal 220 toward the raised position, as described next.

Figure 5A:
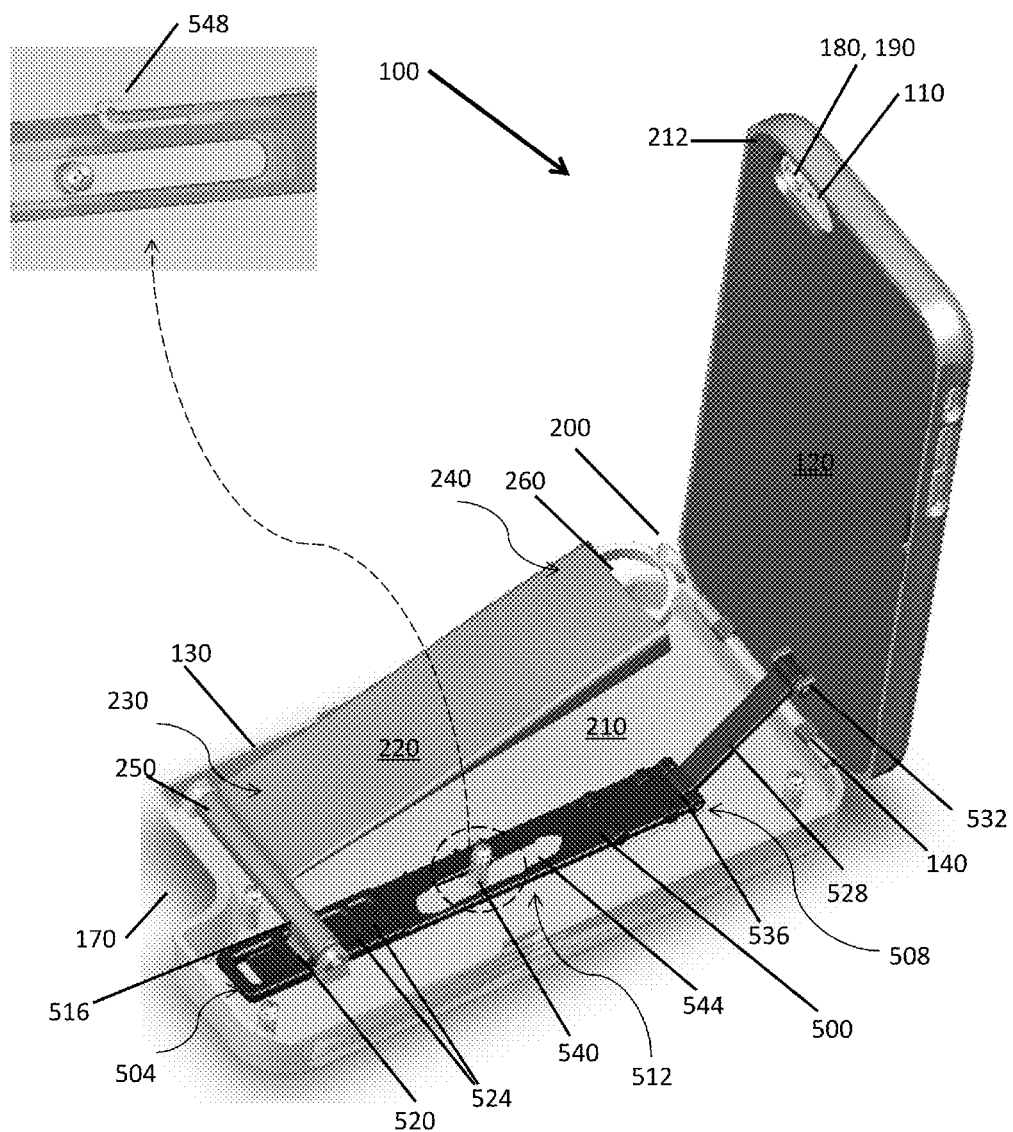
FIG. 5A is one embodiment of the pedestal movement mechanism being a cam mechanism.

One mechanism for moving the pedestal 220 about the second hinge 250 is through the use of a cam mechanism, as illustrated in FIG. 5A. The cam mechanism comprises a slider 500. The slider 500 can be disposed within the hollow cavity 210. The slider has a first end 504, a second end 508, and a middle 512.

The second end 508 of the slider 500 has a first slider hinge 536. This first slider hinge 536 connects to a beam 528. The beam 528 comprises a second slider hinge 532 which attaches the beam 528 to the first housing 120. As the second housing 130 moves away from the first housing 120 towards an open position, the beam 528 and the first and second slider hinges 532, 536, allow the slider 500 to move within the hollow cavity 210.

The first end 230 of the pedestal 220 is connected to a shaft 516. The shaft further comprises a cam 520. The first end 504 of the slider 500 comprises a series of divots 524. The cam 520 is capable of meshing with the divots 524. As the slider 500 moves within the hollow cavity 210, the cam 520 ratchets from one divot 524 to the next. As the cam 520 moves along the divots 524, the shaft 516 turns. As the shaft 516 rotates, the pedestal 220 moves from a lowered position (FIG. 2A) to a raised position (FIG. 2B).

The middle 512 of the slider 500 comprises an alignment hole 540. A pin 535 rises from the second housing 130. The pin 535 is located at a point within the alignment hole 540. As the slider 500 moves within the hollow cavity 210, the location of the pin within the alignment hole 540 varies. When the pedestal 220 is in a lowered position (FIG. 2A), the pin 540 is located closer to the first end 504 of the slider 500. When the pedestal 220 is in a raised position (FIG. 2B), the pin 540 is located closer to the second end 508 of the slider 500. And when the pedestal 220 is being moved from the lowered position to the raised position (FIG. 2C), the pin 540 moves from a location closer to the second end 508 of the slider 500 to a location closer to the first end 504 of the slider 500. The pin 535 can serve the additional function of preventing the slider 500 from moving horizontally within the hollow cavity 210 instead of vertically.

The cam mechanism further comprises a slider locking mechanism 536. This slider locking mechanism 548 can be, for example, a flexible hinge. The slider locking mechanism 548 prevents the slider 500 from moving once the pedestal 220 has reached a raised position.

To ensure that the pedestal is secure in the upright positions against tilting backwards or forwards, the cam can be shaped so that it rotates from +10 degrees up to −80 degrees (instead of from +45 degrees to −45 degrees). A light spring can be added that causes the arm to automatically retract when the case is closed. In some embodiments, the detent mechanism on the slider can be replaced with a small detent (or flat spot) on the cam. Furthermore, the pedestal can be modified to ensure that there is sufficient clearance to prevent the pedestal from getting pinned or otherwise stuck against a side of the case.

Another mechanism for moving the pedestal 220 about the second hinge 250 is through the use of a rack and pinion mechanism, as illustrated in FIG. 5B. The mechanism is located within the hollow cavity 210. The rack 552 consists of a series of teeth 556 while the pinion 560 is a gear with corresponding teeth 564. In one embodiment, the first part of the rack 556 has no teeth so that the mechanism for raising the pedestal 220 is delayed until after the second housing 130 has started to move to an open position. To provide more leverage for movement of the pedestal, a first end 576 of a filament 572 can be connected to an anchor point 584 near the top of the inner portion of the first housing 120 while the second end 580 of the filament 572 can be connected to a first end 588 of the rack 552. As the second housing 130 moves to an open position, the rack 552 is pulled backward relative to the pinion 560. As the second housing 130 moves to an open position, the filament 572 causes the rack 552 to move relative to the pinion 560. The teeth 564 on the pinion 560 mesh with the teeth 544 on the rack 552. As the pinion 560 rotates, the pedestal 220 is moved to a raised position by displacement of the filament.

Figure 6A:
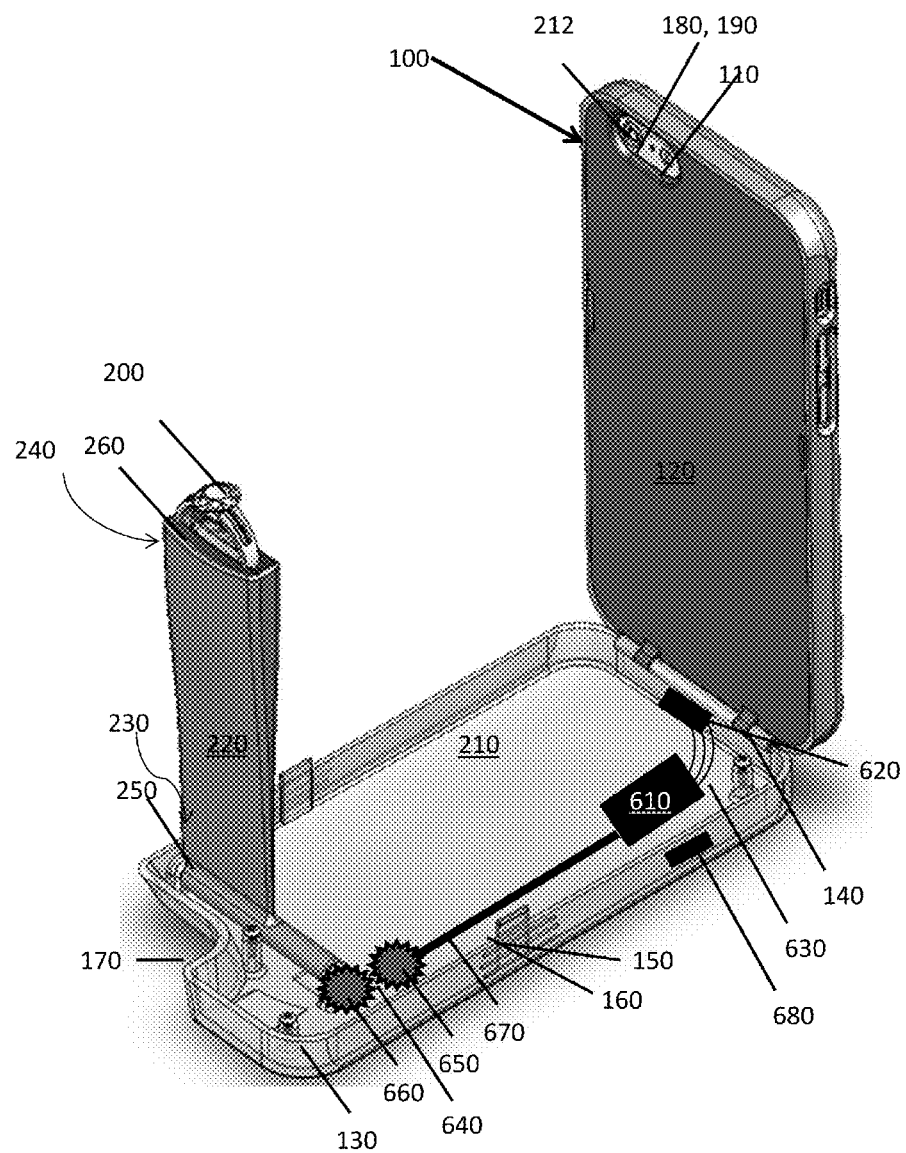
Figure 6C:
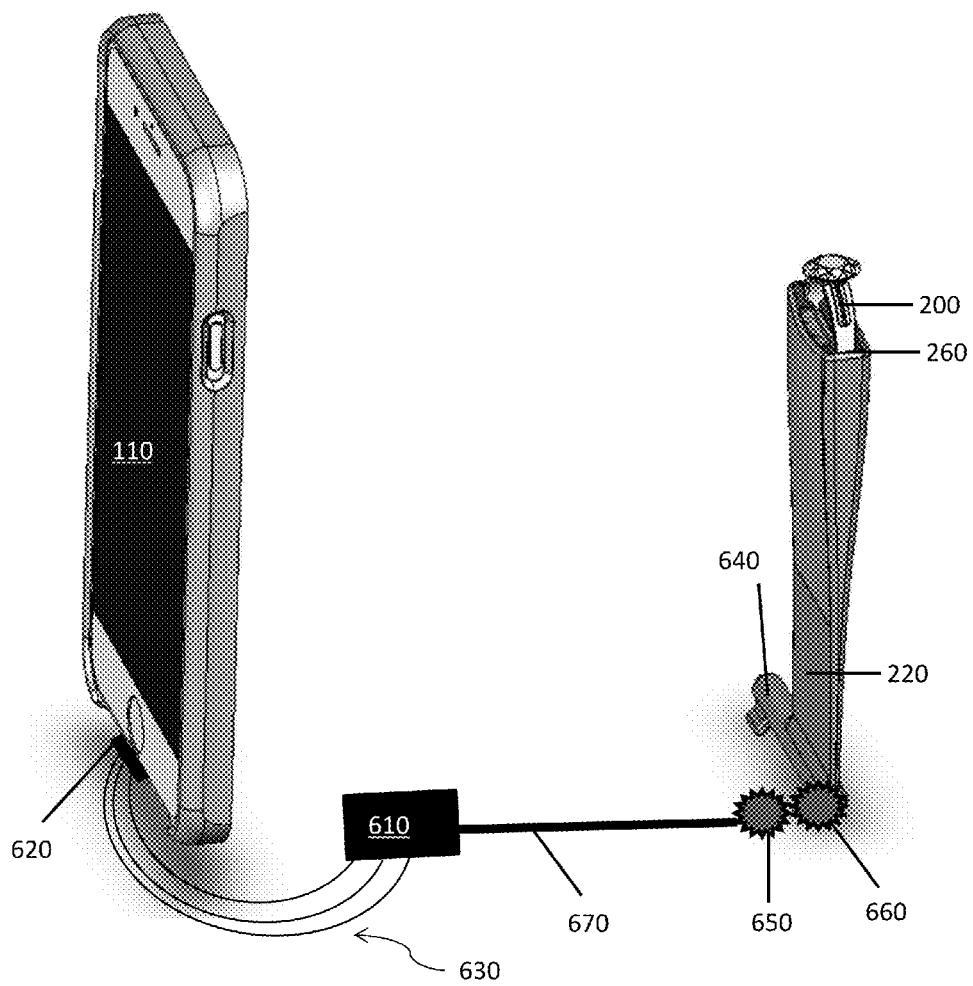

Another mechanism that can be employed for moving the pedestal 220 about the second hinge 250 is through the use of a motor 610, as illustrated in FIGS. 6A-6C. In one embodiment, the motor 610 receives power directly from the mobile phone 110 through the use of wires 630 by plugging a connector 620 into the charging port of the phone. The motor 610 can housed in either of the housings, and can be conveniently contained within the hollow cavity 210. The motor 610 transfers energy to a drive mechanism 640 which moves the pedestal 220 to a raised position. The drive mechanism 640 can be comprised of two or more gears 650, 660. A shaft 670 connects the motor 610 to the first gear 650. The two or more gears 650, 660, mesh together and their turning motion enables the pedestal 220 to move to a raised position. Alternatively, the motor shaft can be coupled directly to the drive mechanism 640 of the pedestal, such as by glue (FIG. 6C). To constrain the pedestal 220 to rise at the desired time, the motor can be connected to a switch 680 which can move from an "on" position to an "off" position. In one embodiment, the switch 680 can be a manual switch coupled to the motor. Optionally, the motor switch can be coupled to the latch 160 and activated when the second housing is unlatched from the first housing. In another embodiment, the switch can be built into a software program on the phone and operate to activate the motor by applying power from the phone to the motor.

Figure 7:
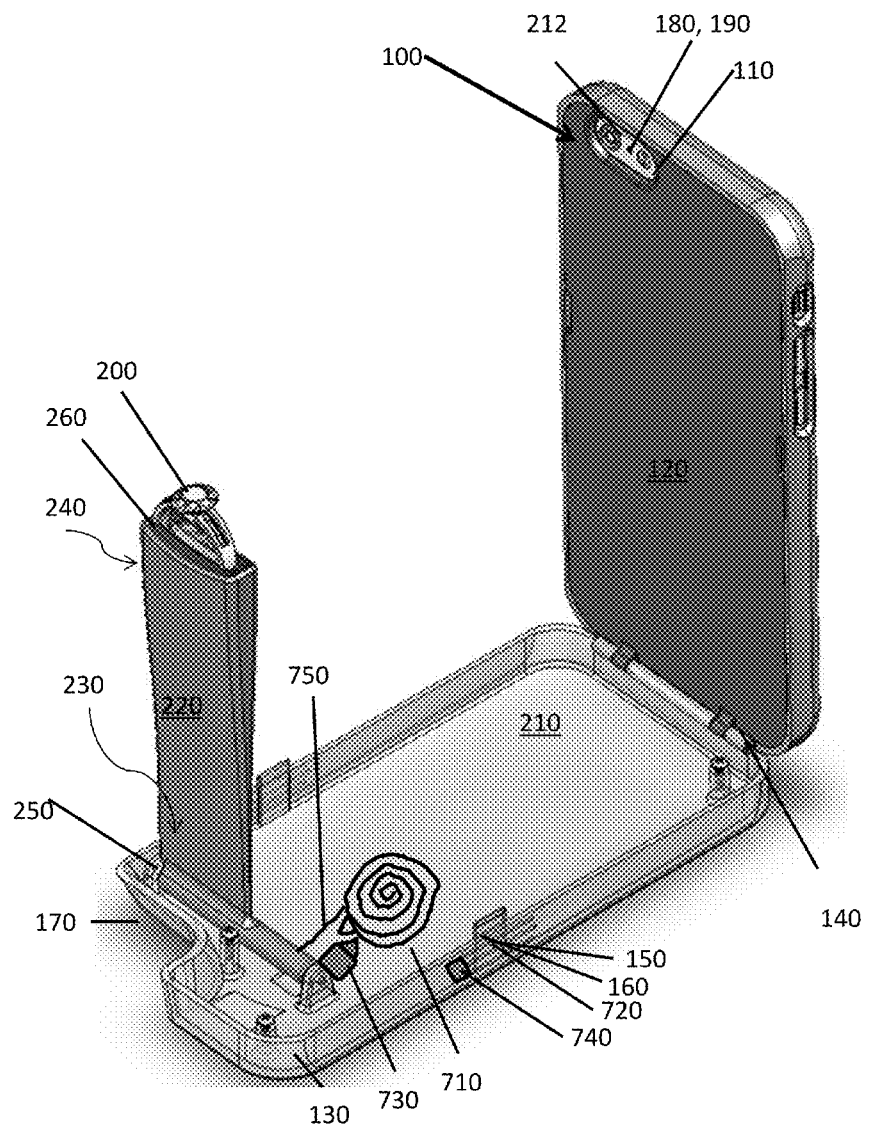
FIG. 7 is one embodiment of the pedestal movement mechanism being a compression spring.

Another mechanism for moving the pedestal 220 about the second hinge 250 to a raised position is through the use of a spring 710, as illustrated in FIG. 7. The spring can be disposed within the hollow cavity 210. For instance, the spring can be a compression spring. The spring 710 is connected to a series of one or more gears or connection elements 750 which couple to the drive mechanism 640 of the pedestal. These gears or connection elements 750 move as a result of the compression spring 710 unwinding, and that movement can be coupled in a conventional manner to the drive mechanism to drive the pedestal to a raised position. For instance, as the compression spring 710 unwinds, the gears or connection elements 750 cause the pedestal 220 to be moved to a raised position by using energy stored in the spring to effect a rotation of the first end of the pedestal about the second hinge 250.

In one embodiment, the compression spring 710 is wound once the ring 200 is securely in place in the ring retainer 160 and the second housing 130 is moved to a closed position. This can be accomplished, for example, by having a thumb wheel 720 located on the second housing 130 which is manually turned in order to wind the spring. A clutch 730 can engage the compression spring as it is wound until the clutch is released. When ready for use, a release 740 located on the second housing 130 can be engaged, for example by pressing inward, and the compression spring 710 is then able to uncoil and move the pedestal 220 to a raised position. Optionally, the clutch release can be coupled to the latch 160 so that the stored energy in the spring is applied to the pedestal to raise it after the second housing is unlatched from the first housing. As will be appreciated, the stored energy will only be released when the free end of the pedestal having the ring support 260 is clear of the first housing. In this way, the pedestal will rise while the second housing moves to the open position.

In one embodiment, the compression spring 710 releases at a constant rate to enable the pedestal 220 to move to a raised position at a constant rate.

An optional mechanism that can be used in connection with moving the pedestal 220 about the second hinge 250 toward a raised position is through the inclusion of a damper mechanism. The damper mechanism allows a dampened, controlled (e.g., constant) rate of motion toward the raised position. This can be used in connection with a spring mechanism or can be used on its own as the mechanism to move the pedestal to the raised position.

Still another mechanism for moving the pedestal 220 about the second hinge 250 toward a raised position is through the use of a pulley system, as illustrated in FIG. 8. The pulley system can be disposed within the hollow cavity 210. In this arrangement, the first end 576 of a filament 572 is connected to an anchor point 584 located near the top of the inner portion of the first housing 120. The filament 572 then runs down the length of the first housing 120 around a first pulley 810. In this embodiment, the first pulley 810 is located at or near the top of the inner portion of the second housing 130. The filament 572 continues to wind around one or more additional pulleys 820. The second end 580 of the filament 572 ultimately connects to the pedestal 220. When the second housing 130 moves to an open position, it causes the filament 572 to tighten around the pulleys 810, 820, and this causes the pedestal 220 to move to a raised position.

In one embodiment, the second housing 130 can further include a flexible portion 410. In this embodiment, the flexible portion 410 is located proximate to the free end 240 of the pedestal 220. This flexible portion 40 is selectively deflectable in response to the presence of an engagement ring 200 within the hollow cavity 210. This enables the second housing 130 to accommodate an engagement ring 200 that is larger than the dimensions of the cavity 210 to still fit within the cavity. In another embodiment, the second housing 130 can made entirely of a flexible material.

In one embodiment, as shown in FIG. 1, the second housing 130 is the same length and width as the first housing 120. In another embodiment, the second housing 130 has a shorter length and/or a shorter width than the first housing 120. In an embodiment where the second housing 130 has a shorter length than the first housing 120, the first hinge 140 can be located at the bottom of the second housing 130 rather than at the bottom of the entire case. In use, a digital video or photos can capture the course of a proposal by having the case 110 attached to the phone 110 with the cut-out 170 in register with the phone's camera 180. The phone user mounts the ring 200 to the ring support 260 of the pedestal and secures the second housing in the closed position adjacent the first housing. When a selected moment arrives for the proposal by the user, the user first commences capture of digital video using the camera 180 on the mobile phone 110. Alternatively, the user can chose to take photos using the camera 180 instead of capturing a digital video. Optionally, the user can turn the phone 110 to airplane mode in order to prevent any interruption of the video recording, such as may happen if a notification is received or otherwise presented at the mobile phone. The user then releases the securing mechanism 150 of the case 110 to enable the second housing 130 to move to an open position and the pedestal 220 to move (or be moved) to a raised position. The pedestal 220 can move to a raised position after or during the movement of the second housing 130 to an open position. When the user orients the engagement ring 200 and phone camera 180 towards the ring recipient, the entire moment of proposal is captured on digital video.

From the foregoing it can be appreciated that, even though there are several cell phone cases on the market, none are specifically designed for use in the course of recording a video or taking photos during the moment of a proposal. A phone case in accordance with the embodiments described herein enables an engagement ring to be stored safely and discretely within the phone case until the moment of the proposal, at which point the case opens. The engagement ring can be raised concomitantly with the opening of the phone case, on a pedestal, to be presented to recipient, all while the cell phone camera captures the entire moment on video.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present disclosure, which is set forth in the features recited the following claims and the respective equivalents of such features.

We claim:

1. A case for housing a mobile phone and an engagement ring, the mobile phone being of a type that includes a camera having a lens, comprising:
    a first housing sized and shaped to receive the phone;
    a second housing coupled to the first housing and sized and shaped to receive the engagement ring therein, the second housing movable relative to the first housing from a closed position in which the engagement ring is concealed by the first housing to an open position in which the engagement ring is displayed; and
    a pedestal disposed within the second housing, the pedestal adapted to position the engagement ring at least partly within a field of view of the lens of the camera when the second housing is in the open position.

2. The case of claim 1, wherein the pedestal is adapted to support the engagement ring at least partly within the field of view of the lens of the camera when the second housing is in the open position by moving from a first position to a second position, wherein the first position supports the engagement ring within the second housing and the second position supports the engagement ring at location spaced from the second housing.

3. The case of claim 2, further comprising a mechanism operative to move the pedestal from the first position to the second position while the second housing is in the open position or is being moved toward the open position.

4. The case of claim 3, wherein the mechanism pivots from the first position to the second position.

5. The case of claim 4, wherein the pedestal is coupled to the second housing by a hinge.

6. The case of claim 5, wherein the pedestal is moveable about the hinge in response to movement of a cam mechanism.

7. The case of claim 5, wherein the pedestal is moveable about the hinge in response to movement of a rack and pinion mechanism.

8. The case of claim 5, wherein the pedestal is moveable about the hinge in response to release of a compression spring.

9. The case of claim 5, wherein the pedestal is movable about the hinge in response to a pulley system.

10. The case of claim 5, wherein the pedestal is moveable about hinge in response to actuation of a motor.

11. The case of claim 1, further comprising a ring retainer supported at an end of the pedestal.

12. The case of claim 11, wherein the ring retainer comprises at least one flexible protrusion.

13. The case of claim 1, wherein the second housing is coupled to the first housing by a hinge.

14. A case for housing a mobile phone and an engagement ring, the mobile phone being of a type that includes a camera having a lens, comprising:
    a first housing sized and shaped to receive the phone;
    a second housing coupled to the first housing and sized and shaped to receive the engagement ring therein, the second housing movable relative to the first housing from a closed position in which the engagement ring is concealed by the first housing to an open position in which the engagement ring is displayed; and
    a pedestal disposed within the second housing, the pedestal being moveable from a first position to a second position, wherein the first position supports the engagement ring within the second housing and the second position supports the engagement ring at location spaced from the second housing.

15. A method for capturing a digital video during the course of a proposal using a camera of a mobile, the method comprising:
    providing a case including a first housing to receive the mobile phone, a second housing coupled to the first housing and an aperture, the second housing including a pedestal for mounting an engagement ring, the second housing movable relative to the first from a closed position in which the engagement ring is concealed by the first housing to an open position in which the engagement ring is displayed;
    attaching the case to the mobile phone such that the camera is disposed in register with the aperture;
    mounting an engagement ring to the pedestal;
    securing the second housing in the closed position;
    commencing capture of the digital video using the camera of the mobile phone; and
    activating a mechanism for moving the second housing to the open position.

16. The method of claim 15, wherein the pedestal pivots to a raised position when the second housing moves to the open position.

17. The method of claim 15, further comprising prepositioning the engagement ring toward a recipient while capturing the digital video using the camera.

18. The method of claim 15, wherein the camera of the mobile phone has a lens, and wherein the second housing moves from the closed position to the open position free of any interruption of the field of view of the lens.

19. The method of claim 15, further comprising releasably securing the second housing to the first housing using a securing mechanism.

20. The method of claim 19, further comprising releasing the securing mechanism of the case after the commencing step and before the activating step.

* * * * *